United States Patent
Hong et al.

(10) Patent No.: US 10,445,005 B2
(45) Date of Patent: Oct. 15, 2019

(54) MEMORY SYSTEM AND OPERATING METHOD THEREOF

(71) Applicant: SK hynix Inc., Gyeonggi-do (KR)

(72) Inventors: Do-Sun Hong, Gyeonggi-do (KR); Yong-Ju Kim, Seoul (KR); Dong-Gun Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 188 days.

(21) Appl. No.: 15/726,460

(22) Filed: Oct. 6, 2017

(65) Prior Publication Data

US 2018/0157427 A1    Jun. 7, 2018

(30) Foreign Application Priority Data

Dec. 6, 2016   (KR) .................. 10-2016-0165228

(51) Int. Cl.
*G06F 12/00*   (2006.01)
*G06F 3/06*   (2006.01)
*G06F 12/02*   (2006.01)

(52) U.S. Cl.
CPC .......... *G06F 3/0616* (2013.01); *G06F 3/064* (2013.01); *G06F 3/0647* (2013.01); *G06F 3/0652* (2013.01); *G06F 3/0673* (2013.01); *G06F 3/0679* (2013.01); *G06F 12/0246* (2013.01); *G06F 2212/1036* (2013.01); *G06F 2212/1041* (2013.01); *G06F 2212/7201* (2013.01); *G06F 2212/7211* (2013.01)

(58) Field of Classification Search
CPC ...... G06F 3/0616; G06F 12/10; G06F 3/0679; G06F 3/0656; G06F 3/0653; G06F 3/0632; G06F 3/0659; G06F 2212/65
See application file for complete search history.

(56) References Cited

U.S. PATENT DOCUMENTS 8,601,202 B1 *   12/2013   Melcher ............... G11C 16/349
                                        711/103

FOREIGN PATENT DOCUMENTS

| KR | 1020050079991 | 8/2005 |
| KR | 1020090105143 | 10/2009 |
| KR | 1020100019322 | 2/2010 |

* cited by examiner

*Primary Examiner* — Arvind Talukdar
(74) *Attorney, Agent, or Firm* — IP & T Group LLP

(57) ABSTRACT

A memory system includes a wear-leveling module detecting a hot memory block among a plurality of memory blocks based on the number of times write operations are performed on each of the memory blocks, and moving data from the hot memory block to a spare memory block, a counting unit counting the number of data movement from the hot memory block to the spare memory block, on each of memory regions formed by grouping the plurality of memory blocks, and output data movement counts, a first detection unit selecting one from the plurality of memory regions based on the data movement count, and detecting a cold memory block among memory blocks included in the selected memory region, and a management unit moving data from the cold memory block to the hot memory block, and managing the cold memory block as the spare memory block.

20 Claims, 5 Drawing Sheets

FIG. 4

| | BMC | PBA | FLAG | |
|---|---|---|---|---|
| REGION1 | 10 | 0 | 1 | |
| | | 1 | 1 | |
| | | 2 | 1 | |
| | | 3 | 0 | |
| REGION2 | 5 | 4 | 0 | |
| | | 5 | 1 | |
| | | 6 | 1 | |
| | | 7 | 0 | |
| REGION3 | 4 | 8 | 1 | |
| | | 9 | 1 | |
| | | 10 | 0 | ← cold memory block |
| | | 11 | 1 | |
| REGION4 | 12 | 12 | | |
| | | 13 | | |
| | | 14 | | |
| | | 15 | | |
| REGION5 | 17 | | | |
| REGION6 | 20 | | | |
| ⋮ | ⋮ | ⋮ | ⋮ | |
| REGION512 | 15 | 2044 | 0 | |
| | | 2045 | 0 | |
| | | 2046 | 1 | |
| | | 2047 | 1 | |

MEMORY SYSTEM AND OPERATING METHOD THEREOF

CROSS-REFERENCE TO RELATED APPLICATION

This application claims priority under 35 U.S.C. § 119 to Korean Patent Application No. 10-2016-0165228 filed on Dec. 6, 2016 in the Korean Intellectual Property Office, the disclosure of which is incorporated herein by reference in its entirety.

TECHNICAL FIELD

Exemplary embodiments relate to a memory system, and more particularly, to a memory system for wear-leveling a nonvolatile memory device, and an operating method thereof.

DISCUSSION OF THE RELATED ART

Semiconductor memory devices are generally classified into a volatile memory device and a nonvolatile memory device.

The volatile memory device has high write and read speed, but loses data stored therein when the power supply is cut off. Examples of the volatile memory device include a dynamic random access memory (DRAM), a static RAM (SRAM), etc. Alternatively, the nonvolatile memory device has comparatively low write and read speed, but retains data stored therein even when the power is cut off. Therefore, the nonvolatile memory device is used when there is a need for storing data which should be retained regardless of the supply of power. Representative examples of the nonvolatile memory devices include a read only memory (ROM), a mask ROM (MROM), a programmable ROM (PROM), an erasable programmable ROM (EPROM), an electrically erasable programmable ROM (EEPROM), a flash memory, a phase change RAM (PCRAM), a magnetic RAM (MRAM), a resistive RAM (RRAM), a ferroelectric RAM (FRAM), etc.

The nonvolatile memory devices such as the RRAM, the PCRAM and the like have limited write endurance. The write endurance may be defined as the number of program/write cycles, which is applied to a memory block before a storage media loses its reliability. The write endurance may be calculated by estimating how often and how evenly the memory is used.

Therefore, when write operations are focused on a certain memory cell region, the lifetime of the memory device may be rapidly reduced. To address the foregoing concern, a wear-leveling operation is performed so that write operations are uniformly performed on all memory cell regions of the memory device. The wear-levelling operation is a technique used to improve the write endurance of the storage media. In this technique, when data are written in the storage media, distributed write operations are performed on respective memory cells. Accordingly, repetitive use of a certain memory cell of the storage media may be reduced, and all memory cells may be uniformly used.

Typically, the wear-leveling operation is performed by a memory controller. For example, the memory controller controls the memory cells such that, when a write request for the storage media is inputted from a host, a write operation is performed mainly on memory cells that have been less used among empty memory cells, by performing an appropriate mapping operation between logical addresses and physical addresses taking into account the number of times for overwrite operations.

SUMMARY

Various embodiments are directed to a memory system capable of uniformly using a plurality of memory regions included in a memory device by moving data between the plurality of memory regions depending on frequency of data access to the memory regions, and an operating method thereof.

In accordance with an embodiment of the present invention, a memory system includes: a memory device including a plurality of memory blocks and at least one spare memory block; a wear-leveling module configured to detect a hot memory block among the plurality of memory blocks based on the number of times write operations are performed on each of the plurality of memory blocks, and move data from the hot memory block to the spare memory block; a counting unit configured to count the number of data movement from the hot memory block to the spare memory block, on each of memory regions formed by grouping the plurality of memory blocks, and output data movement counts; a first detection unit configured to select one from the plurality of memory regions based on the data movement counts, and detect a cold memory block among memory blocks included in the selected memory region; and a management unit configured to move data from the cold memory block to the hot memory block, and manage the cold memory block as the spare memory block In accordance with an embodiment of the present invention, an operating method for a memory system includes: providing a memory device including a plurality of memory blocks and at least one spare memory block; detecting a hot memory block among the plurality of memory blocks based on the number of times write operations are performed on each of the plurality of memory blocks; moving data from the hot memory block to the spare memory block; counting the number of data movement from the hot memory block to the spare memory block on each of memory regions formed by grouping the plurality of memory blocks, and outputting data movement counts; selecting one from the plurality of memory regions based on the data movement counts; detecting a cold memory block among memory blocks included in the selected memory region; and moving data from the cold memory block to the hot memory block, and managing the cold memory block as the spare memory block.

BRIEF DESCRIPTION OF THE DRAWINGS

FIG. 4 is a diagram illustrating a wear-leveling operation of the memory system illustrated in FIG. 3.

DETAILED DESCRIPTION

Figure 1:
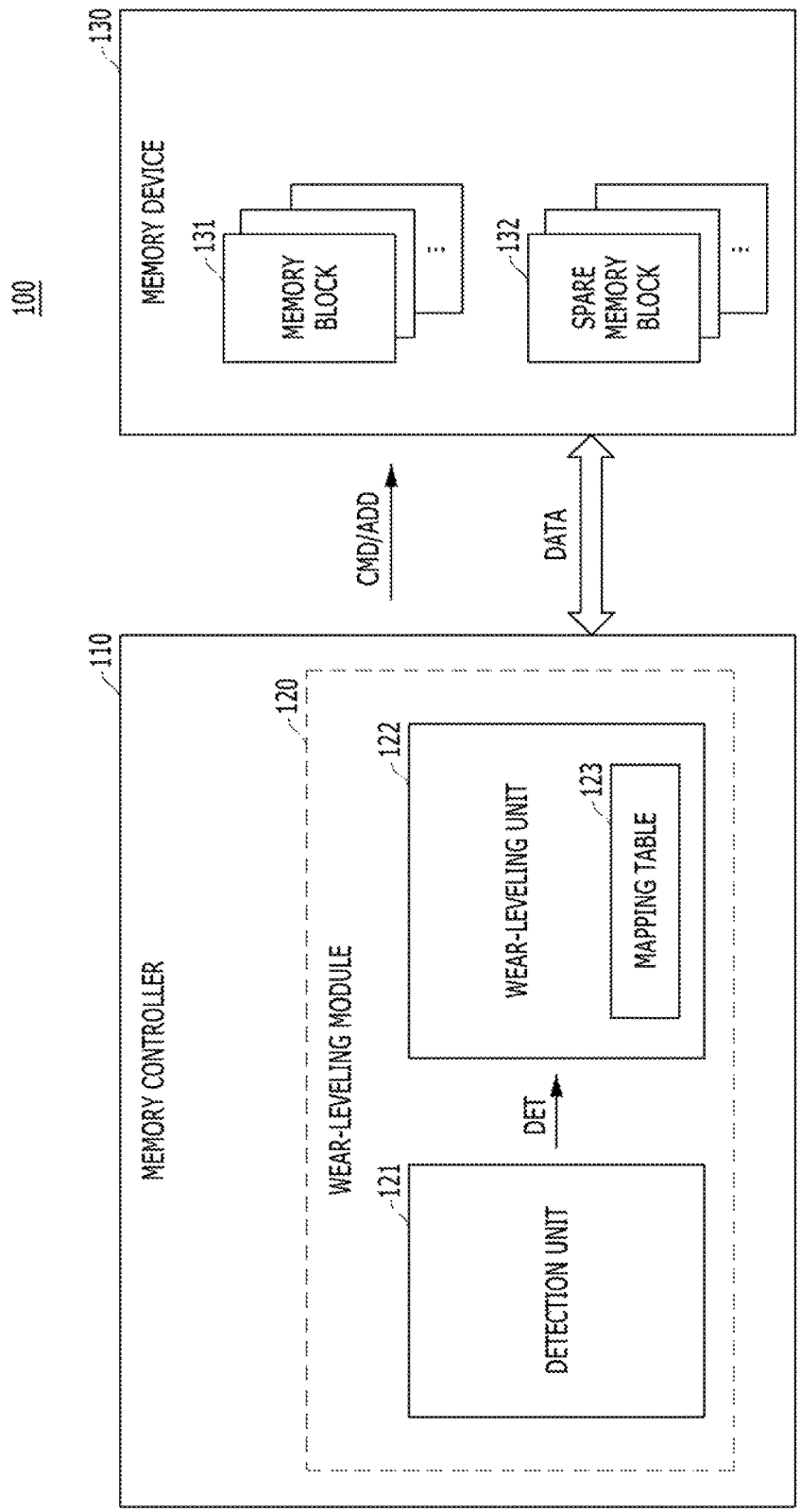
FIG. 1 is a block diagram illustrating a memory system.

Various embodiments will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present disclosure.

FIG. 1 is a block diagram illustrating a memory system 100.

Referring to FIG. 1, the memory system 100 may include a memory controller 110, and a memory device 130. The memory controller 110 may generate a command CMD and an address ADD, according to a request from a host (not shown), and store data DATA in the memory device 130.

The memory device 130 may include a plurality of memory blocks 131, each of which includes a plurality of memory cells, and at least one or more extra memory blocks 132, that is, spare memory blocks. In accordance with an embodiment, the memory device 130 may include a PCRAM. However, the present disclosure is not limited to this, and it may include a variable resistance memory device such as an MRAM, a RRAM, and an FRAM. The variable resistance memory device may divide data stored therein by the magnitude of resistance of a memory cell. Furthermore, the variable resistance memory device may provide an overwrite operation without performing an erase operation before writing data in the memory device. That is, data '0' that has been stored in a memory cell may be changed to data '1' by a write operation, or data '1' may be changed to data '0'.

The memory device 130 may be worn on a basis of a unit on which a write operation is performed and a wear-leveling operation may also be performed on a basis of the unit on which the write operation is performed. In this case, write operations have to be counted and distributed on a basis of the unit on which each write operation is performed, for example, by pages. This may increase overhead in operation of the memory controller 110 that controls the memory device 130.

Consequently, the memory device 130 may be divided into memory blocks 131 having the same size, and the wear-leveling operation may be performed on a basis of each memory block 131. For instance, the wear-leveling operation may be performed while changing mapping information between logical block addresses (LBA) and physical block addresses (PBA) in a mapping table based on the memory block 131. This operation will be described in more detail further below.

To perform the wear-leveling operation of the memory device 130, the memory controller 110 may include a wear-leveling module 120. As shown in FIG. 1, the wear-leveling module 120 may include a detection unit 121 and a wear-leveling unit 122.

The detection unit 121 may include a counter (not shown) counting the number of write operations which are performed on each of the memory blocks 131 of the memory device 130 in response to a write operation request from the host, and outputting a write operation count. To achieve this, when a write operation is performed, the detection unit 121 may check data corresponding to logical block addresses LBA inputted from the host. Furthermore, when the write operation count exceeds a write access threshold the detection unit 121 may generate a detection signal DET for a corresponding memory block. That is, the detection unit 141 may detect, as a hot memory block, a memory block of which the write operation count is greater than the write access threshold among the memory blocks 131, and then generate the detection signal DET for the hot memory block.

The wear-leveling unit 122 may perform a wear-leveling operation on the detected hot memory block, in response to the detection signal DET inputted from the detection unit 121. The wear-leveling unit 122 may move data stored in the hot memory block to a spare memory block 132 in which no data is stored. The wear-leveling unit 122 may include a mapping table 123, and update the mapping table 123 when data stored in the hot memory block is moved to a spare memory block 132. That is, a logical address of data that has been mapped to a physical address of the hot memory block may be mapped to a physical address of the spare memory block 132.

Figure 2:
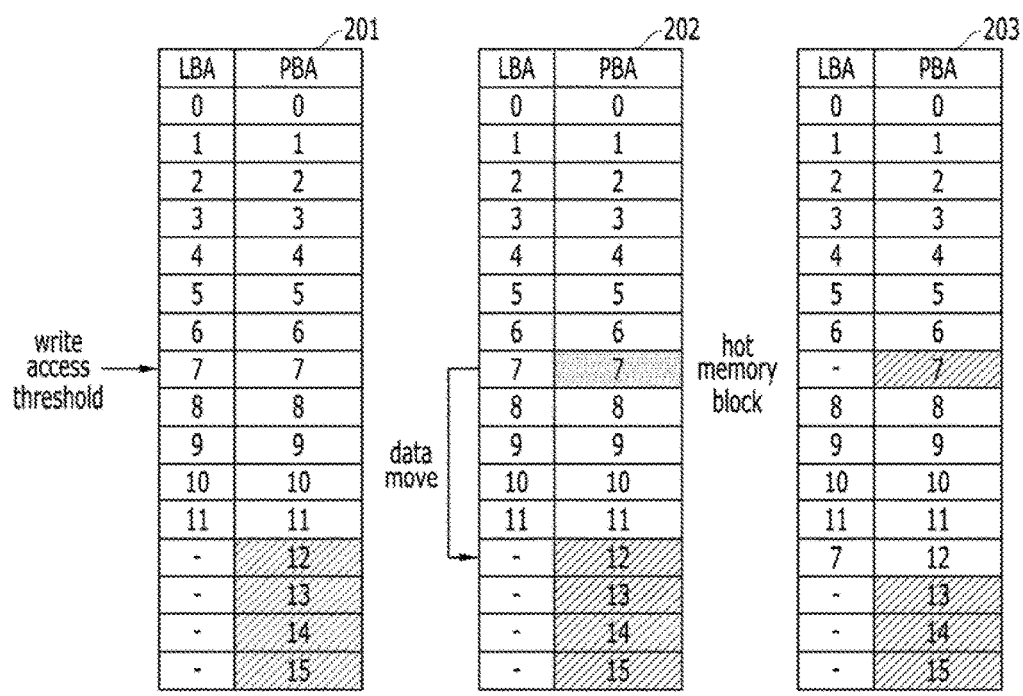
FIG. 2 is a diagram illustrating a wear-leveling operation of the memory system illustrated in FIG. 1.

FIG. 2 is a diagram illustrating a ear-leveling operation of the memory system 100 illustrated in FIG. 1. According to the wear-leveling operation of the memory system 100, the mapping table 123 of the wear-leveling unit 122 may be updated in first to third tables 201 to 203 of FIG. 2.

The first table 201 of FIG. 2 illustrates that data corresponding to logical block addresses LBA0 to LBA11 are stored in sequence in memory blocks corresponding to physical block addresses PBA0 to PBA11. Memory blocks corresponding to physical block addresses PBA12 to PBA15 remain as a spare memory block, that is, as an empty space in which no data is stored.

When the write operation count of data corresponding to an eighth logical block address LBA7 exceeds the write access threshold, the detection unit 121 detects the corresponding data as hot data. That is, the corresponding memory block which is the memory block associated with the eighth physical block address PBA7, is worn to the degree corresponding to the write access threshold or more, so that the corresponding memory block may be detected as a hot memory block.

Referring to the second table 202 of FIG. 2, the wear-leveling unit 122 may perform a wear-leveling operation by moving the detected hot data to a spare memory block, that is, to a memory block corresponding to a thirteenth physical block address PBA12. Write operations may be uniformly performed on the memory blocks by storing the hot data in a memory block that has not been used.

Consequently, referring to the third table 203 of FIG. 2, the hot memory block, that is, the memory block corresponding to the eighth physical block address PBA7, may be set as a spare memory block and reused.

However, hot data may be stored again, by a wear-leveling operation of the memory device 130, in the memory blocks that have been set as spare memory blocks, particularly, the memory block corresponding to the eighth physical block address PBA7, and write operations may be frequently performed thereon. Therefore, to increase the effects of the wear-leveling operation, data which is not frequently written, that is, cold data, may be stored in the hot memory block that has been detected once or more.

The memory controller 110 may detect not only a hot memory block but also cold memory block that stores cold data, and then may perform a wear-leveling operation. However, it is not easy to detect and manage a cold memory block as it is to detect a hot memory block. For example, in the case of a counter included in the detection unit 121, when it counts all write operations performed on a corresponding memory block, the write operation count is continuously increased. Hence, it is difficult to actually embody the operation of continuously increasing the write operation count. Generally, the write operation count is increased until it reaches the write access threshold before an error occurs on data stored in a memory block due to wear. Thereafter, a wear-leveling operation, that is, an operation of moving data, is performed, then the write operation count is reset. Therefore it is impossible to detect a cold memory block using the write operation count which may have been reset several times.

Figure 3:
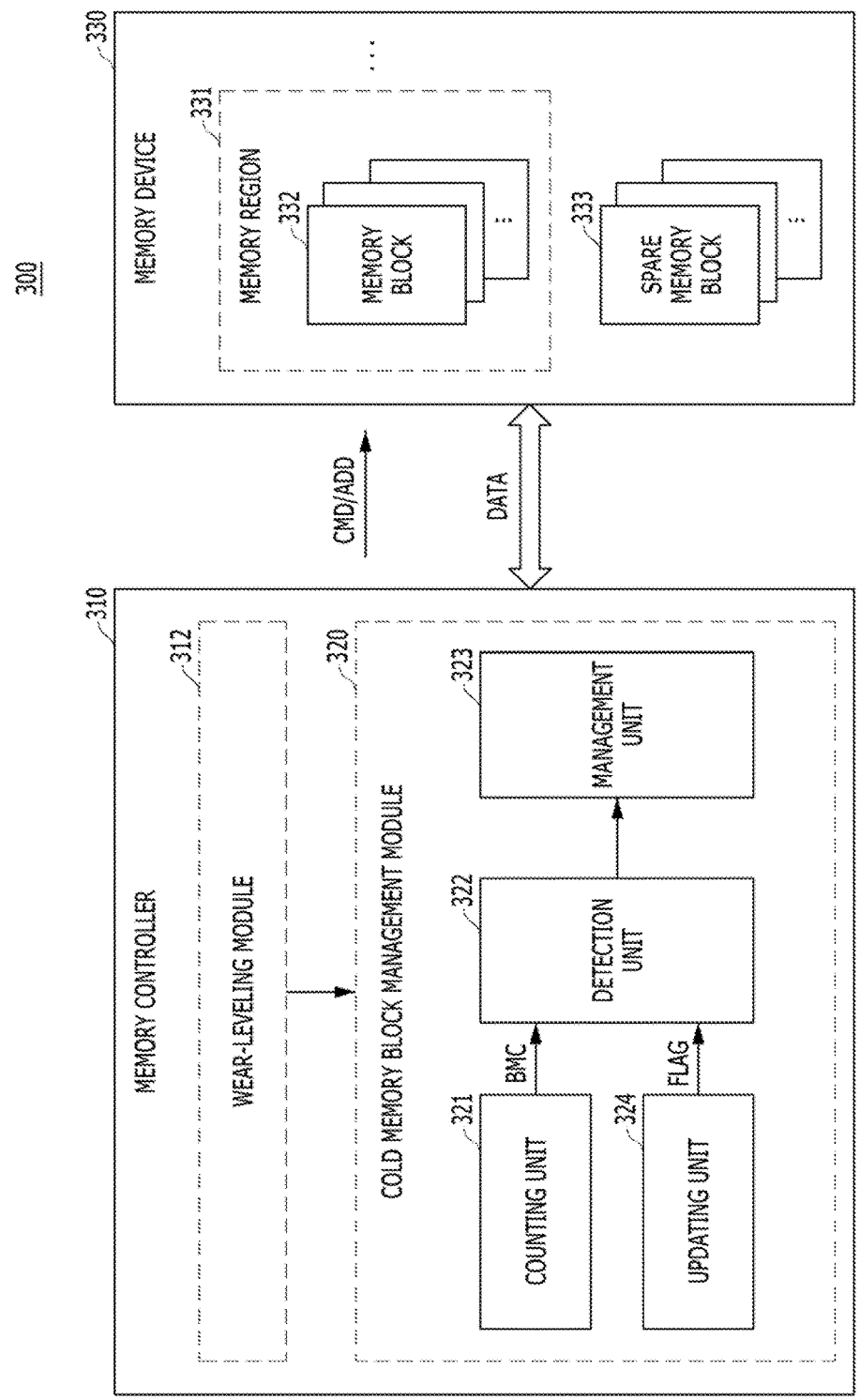
FIG. 3 is a block diagram, illustrating a memory system in accordance with an embodiment of the present invention.

FIG. 3 is a block diagram illustrating a memory system 300 in accordance with an embodiment of the present invention.

Referring to FIG. 3, the memory system 300 may include a memory controller 310 and a memory device 330.

The memory controller 310 may generate a command CMD and an address ADD, according to a request from a host (not shown), and store data DATA in the memory device 330.

The memory device 330 may include a plurality of memory blocks 332, each of which includes a plurality of memory cells, and at least one or more extra memory blocks 333, that is, spare memory blocks. In accordance with an embodiment, the memory device 130 may include a PCRAM. However, the present disclosure is not limited to this, and it may include a variable resistance memory device such as an MRAM, a RRAM, and an FRAM. The variable resistance memory device may divide data stored therein by the magnitude of resistance of a memory cell. Furthermore, the variable resistance memory device may provide an overwrite operation without performing an erase operation before writing data in the memory device. That is, data '0' that has been stored in a memory cell may be changed to data '1' by a write operation, or data 1' may be changed to data '0'.

The memory controller 310 may include a wear-leveling module 312 and a cold memory block management module 320. The wear-leveling module 312 of FIG. 3 has substantially the same structure of the wear-leveling module 120 of FIG. 1. The wear-leveling module 312 may detect a hot memory block among the plurality of memory blocks 332 included in the memory device 330, based on the number of write operations performed on each of the plurality of memory blocks 332. The wear-leveling module 312 may move data from the detected hot memory block to the spare memory blocks 333 included in the memory device 330. The operation or configuration of the wear-leveling module 312 that has been described in the description of FIG. 1 will be omitted.

In accordance with an embodiment the cold memory block management module 320 may detect a cold memory block among the plurality of memory blocks 332. The cold memory block management module 320 may move data from the cold memory block to the hot memory block detected by the wear-leveling module 312, and then manage the cold memory block as the spare memory block 333.

As shown in FIG. 3, the cold memory block management module 320 may include a counting unit 321, a detection unit 322, and a management unit 323. The counting unit 321 may include a counter (not shown) and count the number of data movement from the hot memory block to the spare memory blocks 333, on respective memory regions 331 formed by grouping the plurality of memory blocks 332. That is, the counting unit 321 may count the number of times hot memory blocks are detected and set as the spare memory blocks 333 by the wear-leveling module 312, hereinafter referred to as block movement counts BMC from hot memory blocks to the spare memory blocks 333.

When moving data from the hot memory block to the spare memory block 333, the wear-leveling module 312 may update a mapping relationship between a physical block address (PBA) of the hot memory block and a logical block address (LBA) of the data to be moved, the mapping relationship being stored in the mapping table 123 (refer to FIG. 1). The counting unit 321 may count the number of times physical block addresses PBA of the memory blocks 332 included in each of the memory regions 331 are updated by the wear-leveling module 312.

The detection unit 322 may select one from the plurality of memory regions 331, based on data movement counts, i.e., the block movement counts BMC obtained by the counting unit 321. The detection unit 322 may select a memory region having a minimum value of the block movement counts BMC, from the plurality of memory regions 331. The detection unit 322 may randomly detect, as a cold memory block, any one of memory blocks included in the selected memory region.

In accordance with another embodiment, the cold memory block management module 320 may further include an updating unit 324. The updating unit 324 may check on a regular cycle whether write operations have been performed on the plurality of memory blocks 332. The updating unit 324 may assign flag information FLAG to each of the plurality of memory blocks 332 or each, group of memory blocks 332 that is, each of the memory regions 331. When the write operations are performed on the plurality of memory blocks 332, the updating unit 324 may set corresponding flag information FLAG. The updating unit 324 may initialize the set flag information FLAG on the regular cycle and thus continuously check characteristics of write operations that are currently performed on the memory device 334. Consequently, based on the flag information FLAG, the detection unit 322 may detect, as a cold memory block, a memory block on which a write operation has not been checked by the updating unit 324, among the memory blocks included in the selected memory region.

The detection unit 322 may detect a plurality of cold memory blocks and store them in a list. When the number of cold memory blocks stored in the list is less than a threshold value, the detection unit 322 may detect a cold memory block by selecting one from the plurality of memory regions 331 based on the block movement counts BMC. Alternatively, when a process is in a standby state, for example, an idle state, the detection unit 322 may detect a cold memory block by selecting one from the plurality of memory regions 331.

The management unit 323 may move data from the cold memory block detected by the detection unit 322 to the hot memory block detected by the wear-leveling module 312. When a hot memory block is detected by the wear-leveling module 312 and data is moved from the hot memory block to the spare memory block 333, the management unit 323 may move data from the cold memory block to the hot memory block and manage the cold memory block, from which the data has been moved, as the spare memory block 333. The management unit 323 may select one cold memory block from the list in which the cold memory blocks are stored by the detection unit 322.

FIG. 4 is a diagram illustrating a wear-leveling operation of the memory system illustrated in FIG. 3.

Referring to FIG. 4, the memory device 330 may include 512 memory regions REGION1 to REGION512. Referring to physical block addresses PBA assigned to the respective regions REGION1 to REGION512, four memory blocks may be grouped into each of the memory regions REGION1 to REGION512, and thus the memory device 330 may include 2048 memory blocks including the plurality of memory blocks 332 and the spare memory blocks 333. However, the present disclosure is not limited to this.

In accordance with an embodiment, the counting unit 321 of the cold memory block management module 320 may count a data movement count at which data have been moved from memory blocks assigned to each of the memory regions REGION1 to REGION512 to spare memory blocks. The counting unit 321 may count a block movement count BMC from memory blocks assigned to each of the memory regions REGION1 to REGION512 to spare memory blocks. For example, referring to FIG. 4, it may check that the block movement count BMC from four memory blocks assigned to the first memory region REGION1 to spare memory blocks is counted as '10'.

When the number of cold memory blocks stored in the list is less than the threshold value, the detection unit 322 may select one memory region from the plurality of memory regions REGION1 to REGION512 based on block movement counts BMC. The detection unit 322 may select a memory region having the minimum value of the block movement counts BMC, from the plurality of memory regions REGION1 to REGION512. Referring to the block movement counts BMC of the plurality of memory regions REGION1 to REGION512, the third memory region REGION3 having the minimum value '4' may be selected. The detection unit 322 may randomly detect, as a cold memory block, one of memory blocks assigned to the third memory region REGION3, that is, memory blocks corresponding to ninth to twelfth physical block addresses PBA8 to PBA11.

In accordance with another embodiment, the updating unit 324 may assign flag information FLAG to each of the plurality of memory blocks. When write operations are performed on memory blocks, the updating unit 324 may set corresponding flag information FLAG to '1'. The updating unit 324 may initialize the set flag information FLAG to '0' on a regular cycle.

As described above, when the third memory region REGION3 is selected the detection unit 322 may check flag information FLAG of the memory blocks assigned to the third memory region REGION3. As a result of checking the flag information FLAG, the detection unit 322 may detect, as a cold memory block, a memory block having flag information FLAG that has not been set. Referring to FIG. 4, among memory blocks corresponding to the ninth to twelfth physical block addresses PBA8 to PBA11, a memory block of which the flag information FLAG is '0' that is a memory block corresponding to the eleventh physical block address PBA10, may be detected as a cold memory block. Therefore, when there are a plurality of memory blocks of which flag information FLAG is '0', the detection unit 322 may randomly detect one of them as a cold memory block.

Furthermore, the management unit 323 may move data from the memory block corresponding to the eleventh physical block address PBA10 that has been detected as the cold memory block, to the hot memory block detected by the wear-leveling module 312. The management unit 323 may manage, as the spare memory block 333, the memory block corresponding to the eleventh physical block address PBA10 from which the data has been moved.

Figure 5:
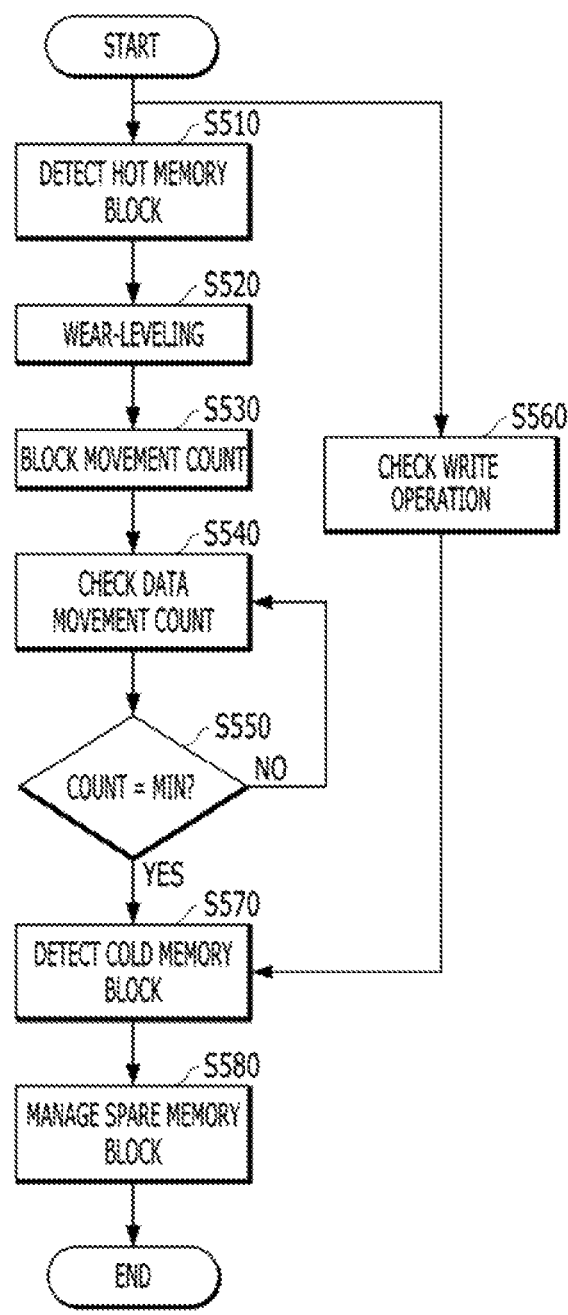
FIG. 5 is a flowchart illustrating an operation of a memory system in accordance with an embodiment of the present invention.

FIG. 5 is a flowchart illustrating an operation of a memory system in accordance with an embodiment of the present invention.

1) Detect a Hot Memory Block (S510)

The detection unit 121 (refer to FIG. 1) of the wear-leveling module 312 may detect a hot memory block based on write operation counts of write operations performed on the plurality of memory blocks 332 (refer to FIG. 3). The detection unit 121 may count the number of times of write operations performed on the plurality of memory blocks 332. The detection unit 121 may detect, as a hot memory block, a memory block having a write operation count which exceeds the write access threshold among the plurality of memory blocks 332.

2) Wear-Leveling (S520)

When the detection unit 121 detects the hot memory block, the wear-leveling unit 122 (refer to FIG. 1) of the wear-leveling module 312 may perform a wear-leveling operation on the detected hot memory block. That is, the wear-leveling unit 122 may move data from the hot memory block to the spare memory block 333. To move the data from the hot memory block to the spare memory block 333, the wear-leveling unit 122 may update mapping relationship between the physical block address PBA of the hot memory block and the logical block address LBA of the data, in the mapping table 123 (refer to FIG. 1) of the wear-leveling unit 122.

3) Block Movement Count (S530)

The counting unit 321 (refer to FIG. 3) may count wear-leveling operations performed by the wear-leveling unit 122. The counting unit 321 may count block movement counts BMC on the respective memory regions 331 formed by grouping the memory blocks 332. That is, the counting unit 321 may count the number of times data are moved from hot memory blocks to the spare memory blocks 333 by the wear-leveling module 312. The counting unit 321 may count the number of times physical block addresses PBA of the memory blocks 332 included in each of the memory regions 331 are updated by the wear-leveling module 312.

4) Select a Cold Memory Region (S540/S550)

To detect a cold memory block, the detection unit 22 (refer to FIG. 3) may select a cold memory region from the plurality of memory regions 331, based on the block movement counts BMC obtained by the counting unit 321 at step S530. The detection unit 322 may detect a plurality of cold memory blocks and store them in a list. When the number of cold memory blocks stored in the list is less than a threshold value, the detection unit 322 may select the cold memory region based on the block movement counts BMC. The detecting unit 322 may check the block movement counts BMC obtained by the counting unit 321, and detect a memory region of which the checked block movement count BMC has the minimum value, as a cold memory region (YES, at step S550). Checking the block movement counts BMC is repeated (NO, at step S550), until the cold memory region is detected.

5) Check Write Operations (S560)

In accordance with another embodiment, the updating unit 324 may check on a regular cycle whether write operations on the memory blocks 332 have been performed. The updating unit 324 may assign flag information FLAG to each of the memory blocks 332 or each group of memory blocks 332. When the write operations are performed on the memory blocks 332, the updating unit 324 may set corresponding flag information FLAG. The updating unit 324 may initialize all of the set flag information FLAG on a regular cycle.

6) Detect a Cold Memory Block (S570)

The detection unit 322 may detect a cold memory block among memory blocks included in the cold memory region. In accordance with an embodiment, the detection unit 322 may randomly detect, as a cold memory block, any one of the memory blocks included in the cold memory region. In accordance with another embodiment, the detection unit 322 may check the flag information FLAG of the memory blocks included in the cold memory region, and detect, as a cold memory block, a memory block having flag information FLAG that has not been set, among the memory blocks included in the cold memory region.

7) Manage Spare Memory Blocks (S580)

The management unit 323 may move data from the cold memory block detected by the detection unit 322 at step 570 to the hot memory block, which has been detected by the wear-leveling module 312 at step S510. The management unit 323 may manage the cold memory block from which the data have been moved, as the spare memory block 333. During continuous operations, when a hot memory block is detected by the wear-leveling module 312, data from the detected hot memory block may be moved to the spare memory block 333.

In accordance with various embodiments, a memory system may divide a memory device into a plurality of memory blocks having the same size, detect a hot memory block to which data are frequently accessed, or on which write operations are frequently performed, and then move data from the hot memory block to another memory block. Therefore, there is an effect of dispersing write operations to the entire memory device. Furthermore, the memory system may move data from a cold memory block on which a write operation is relatively seldom performed, to the hot memory block from which the data have been moved, thus preventing the hot memory block that has been already detected from being redetected.

Moreover, to detect a cold memory block, the memory system may count the number of times of data movement by write operations are greater than a threshold count, without continuously counting the number of times of write operations. Consequently, since the cold memory block is detected by counting only the accumulated write operations, a count operation may be performed by exceeding the threshold value. Therefore, a load in the operation of the memory system for detecting a cold memory block may be reduced.

Although various embodiments have been described for illustrative purposes, it will be apparent to those skilled in the art that various changes and modifications may be made without departing from the spirit and scope of the disclosure as defined in the following claims.

What is claimed is:

1. A memory system comprising:
a memory device including a plurality of memory blocks and a least one spare memory block;
a wear-leveling module configured to detect a hot memory block among the plurality of memory blocks based on the number of times write operations are performed on each of the plurality of memory blocks, and move data from the hot memory block to the spare memory block;
a counting unit configured to count the number of data movement from the hot memory block to the spare memory block, on each of memory regions formed by grouping the plurality of memory blocks, and output data movement counts;
a first detection unit configured to select one from the plurality of memory regions based on the data movement counts, and detect a cold memory block among memory blocks included in the selected memory region; and
a management unit configured to move data from the cold memory block to the hot memory block, and manage the cold) memory block as the spare memory block.

2. The memory system of claim 1, wherein the wear-leveling module comprises:
a second detection unit configured to count the number of times the write operations are performed on each of the plurality of memory blocks, and detect, as the hot memory block, a memory block of which the counted number of times of the write operations exceeds a threshold value, among the plurality of memory blocks; and
a wear-leveling unit configured to move data from the hot memory block to the spare memory block when the hot memory block is detected by the second detection unit.

3. The memory system of claim 1, wherein, when the data are moved from the hot memory block to the spare memory block, the wear-leveling module updates a mapping relationship between a physical block address of the hot memory block and a logical block address of the data.

4. The memory system of claim 3, wherein the counting unit counts the number of times physical block addresses of memory blocks included in each of the memory regions are updated by the wear-leveling module.

5. The memory system of claim 1, wherein the first detection unit detects a plurality of cold memory blocks and stores the detected cold memory blocks in a list, and detects the cold memory block by selecting one from the plurality of memory regions based on the data movement counts when the number of cold memory blocks stored in the list is less than a threshold value.

6. The memory system of claim 1, wherein the first detection unit selects a memory region having a minimum value of the data movement counts, from the plurality of memory regions.

7. The memory system of claim 1, further comprising:
an updating unit configured to check on a regular cycle whether the write operations are performed on the plurality of memory blocks.

8. The memory system of claim 7, wherein the updating unit assigns flag information to each of the plurality of memory blocks or each group of memory blocks, and the updating unit sets the corresponding flag information when the write operations are performed on the plurality of memory blocks.

9. The memory system of claim 7, wherein the first detection unit detects, as the cold memory block, a memory block, that is not checked by the updating unit, among the memory blocks included in the selected memory region.

10. The memory system of claim 1, wherein the first detection unit randomly detects, as the cold memory block, one of the memory blocks included in the selected memory region.

11. An operating method for a memory system, the operating method comprising:
providing a memory device including a plurality of memory blocks and at least one spare memory block;
detecting a hot memory block among the plurality of memory blocks based on the number of times write operations are performed on each of the plurality of memory blocks;
moving data from the hot memory block to the spare memory block;
counting the number of data movement from the hot memory block to the spare memory block on each of memory regions formed by grouping the plurality of memory blocks, and outputting data movement counts;
selecting one from the plurality of memory regions based on the data movement counts;

detecting a cold memory block among memory blocks included in the selected memory region; and moving data from the cold memory block to the hot memory block, and managing the cold memory block as the spare memory block.

12. The operating method of claim 11, wherein the detecting of the hot memory block comprises:

counting the number of times the write operations are performed on each of the plurality of memory blocks; and detecting, as the hot memory block, a memory block of which the counted number of times of the write operations exceeds a threshold value, among the plurality of memory blocks.

13. The operating method of claim 12, wherein the moving of the data from the hot memory block to the spare memory block comprises:

updating a mapping relationship between a physical block address of the hot memory block and a logical block address of the data.

14. The operating method of claim 13, wherein the counting of the number of data movement from the hot memory block to the spare memory block comprises:

counting the number of times physical, block addresses of the memory blocks included in the respective memory regions are updated.

15. The operating method of claim 11, wherein the selecting of one from the plurality of memory regions comprises:

checking the number of cold memory blocks stored in a list; and checking the data movement counts when the number of cold memory blocks is less than a threshold value.

16. The operating method of claim 15, wherein the selecting of one from the plurality of memory regions further comprises:

selecting a memory region having a minimum value of the data movement counts, from the plurality of memory regions.

17. The operating method of claim 11, further comprising:

checking on a regular cycle whether the write operations are performed on the plurality of memory blocks.

18. The operating method of claim 17, wherein the checking on a regular cycle whether write operations are performed on the plurality of memory blocks comprises:

assigning flag information to each of the plurality of memory blocks or each group of memory blocks; and setting the corresponding flag information when the write operations are performed on the plurality of memory blocks.

19. The operating method of claim 7, wherein the detecting of the cold memory block comprises:

detecting, as the cold memory block a memory block on which it is not checked whether the write operation is performed among the memory blocks included in the selected memory region.

20. The operating method of claim 11, wherein the detecting of the cold memory block comprises:

randomly detecting, as the cold memory block, one of the memory blocks included in the selected memory region.

* * * * *